US011967780B2

(12) United States Patent
Li et al.

(10) Patent No.: US 11,967,780 B2
(45) Date of Patent: Apr. 23, 2024

(54) ANTENNA STRUCTURE AND COMMUNICATIONS TERMINAL

(71) Applicant: VIVO MOBILE COMMUNICATION CO., LTD., Dongguan (CN)

(72) Inventors: Rihui Li, Dongguan (CN); Rui Jiang, Dongguan (CN); Zipeng Hou, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 358 days.

(21) Appl. No.: 17/344,899

(22) Filed: Jun. 10, 2021

(65) Prior Publication Data

US 2021/0305702 A1 Sep. 30, 2021

Related U.S. Application Data

(63) Continuation of application No. PCT/CN2019/116599, filed on Nov. 8, 2019.

(30) Foreign Application Priority Data

Dec. 12, 2018 (CN) ........................ 201811521027.X

(51) Int. Cl.
*H01Q 9/04* (2006.01)
*H01Q 5/328* (2015.01)

(52) U.S. Cl.
CPC ........... *H01Q 9/0442* (2013.01); *H01Q 5/328* (2015.01); *H01Q 9/0414* (2013.01)

(58) Field of Classification Search
CPC ..... H01Q 9/0442; H01Q 5/328; H01Q 9/0414
See application file for complete search history.

(56) References Cited

U.S. PATENT DOCUMENTS

2009/0278755 A1 11/2009 Shoji
2013/0203364 A1* 8/2013 Darnell .................. H01Q 1/243 455/90.3
2020/0083865 A1* 3/2020 Mori ...................... H03H 9/706

FOREIGN PATENT DOCUMENTS

CN 101582533 A 11/2009
CN 104242976 A 12/2014
(Continued)

OTHER PUBLICATIONS

International Search Report issued in corresponding International Application No. PCT/CN2019/116599, dated Feb. 11, 2020, 5 pages.
(Continued)

*Primary Examiner* — Dieu T Duong
(74) *Attorney, Agent, or Firm* — IPX PLLC

(57) ABSTRACT

This application provides an antenna structure and a communications terminal. The antenna structure includes an antenna radiator, a signal source, a first capacitor, and a first tuning circuit. A first terminal of the antenna radiator is grounded. A first terminal of the first capacitor and a first terminal of the first tuning circuit are electrically connected to a connection point of the antenna radiator. A second terminal of the first capacitor is electrically connected to the signal source. A second terminal of the first tuning circuit is grounded. Antenna impedance of the first terminal of the first capacitor at target frequencies is in the first quadrant of a Smith chart, and the target frequencies are at least some frequencies in frequency bands covered by the antenna radiator.

20 Claims, 9 Drawing Sheets

(56) References Cited

FOREIGN PATENT DOCUMENTS

| | | | | |
|---|---|---|---|---|
| CN | 105742818 | A | | 7/2016 |
| CN | 107331979 | A | | 11/2017 |
| CN | 108631041 | A | | 10/2018 |
| CN | 109638455 | A | | 4/2019 |
| JP | 2013058934 | A | * | 3/2013 |
| WO | 2014181569 | A1 | | 11/2014 |

OTHER PUBLICATIONS

First Office Action issued in related Chinese Application No. 201811521027.X, dated Nov. 29, 2019.

* cited by examiner

ANTENNA STRUCTURE AND COMMUNICATIONS TERMINAL

CROSS-REFERENCE TO RELATED APPLICATIONS

This application is a continuation of PCT Application No. PCT/CN2019/116599 filed Nov. 8, 2019, which claims priority to Chinese Patent No. 201811521027.X filed in China on Wednesday, Dec. 12, 2018, both of which are incorporated herein by reference in their entireties.

TECHNICAL FIELD

Embodiments of the present disclosure relates to the field of communications technologies, and in particular, to an antenna structure and a communications terminal.

BACKGROUND

Split antennas of high or low frequency are usually used in a communications terminal, and antennas covering different frequency bands are arranged in different areas of the communications terminal in a distributed manner, to make better use of the space of the entire communications terminal. For example, two independent antennas may be arranged in the communications terminal: one is a low-frequency antenna, covering a frequency range of 0.7 GHz to 0.96 GHz (Gigahertz); the other is a medium-high-frequency antenna, covering a frequency range of 1.71 GHz to 2.69 GHz.

However, as "full screen" mobile terminals become popular, the space for an antenna is greatly compressed, resulting in relatively large impedance mismatch loss of the antenna and relatively poor transmission efficiency of the antenna.

SUMMARY

Embodiments of the present disclosure provide an antenna structure and a communications terminal, to resolve the problems in the related art of relatively large impedance mismatch loss of an antenna and relatively poor transmission efficiency of the antenna.

To resolve the foregoing technical problems, the present disclosure is implemented as follows:

According to a first aspect, an embodiment of the present disclosure provides an antenna structure applied to a communications terminal, where the antenna structure includes: an antenna radiator, a signal source, a first capacitor, and a first tuning circuit;

- a first terminal of the antenna radiator is grounded;
- a first terminal of the first capacitor and a first terminal of the first tuning circuit each are electrically connected to a connection point of the antenna radiator, a second terminal of the first capacitor is electrically connected to the signal source, and a second terminal of the first tuning circuit is grounded, where
- antenna impedance of the first terminal of the first capacitor at target frequencies is in the first quadrant of a Smith chart, and the target frequencies are at least some frequencies in frequency bands covered by the antenna radiator.

According to a second aspect, an embodiment of the present disclosure further provides a communications terminal including the antenna structure described above according to the embodiment of the present disclosure.

In the embodiments of the present disclosure, the antenna structure includes: an antenna radiator, a signal source, a first capacitor, and a first tuning circuit; a first terminal of the antenna radiator is grounded; a first terminal of the first capacitor and a first terminal of the first tuning circuit each are electrically connected to a connection point of the antenna radiator, a second terminal of the first capacitor is electrically connected to the signal source, and a second terminal of the first tuning circuit is grounded, where antenna impedance of the first terminal of the first capacitor at target frequencies is in the first quadrant of a Smith chart, and the target frequencies are at least some frequencies in frequency bands covered by the antenna radiator. In this way, in the present disclosure, on the basis of that the antenna impedance of the first terminal of the first capacitor at the target frequencies being in the first quadrant of the Smith chart, high-impedance feeding of the first capacitor, on the one hand, can cause the antenna structure to generate a new resonance manner and optimize a resonant mode excited by the antenna structure; on the other hand, can match antenna impedance of the second terminal of the first capacitor to be close to a matching point of the Smith chart, such that the problem of the impedance mismatch loss of the antenna can be alleviated, which reduces the impedance mismatch loss and in turn can improve the transmission efficiency of the antenna.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DETAILED DESCRIPTION

Figure 1A:
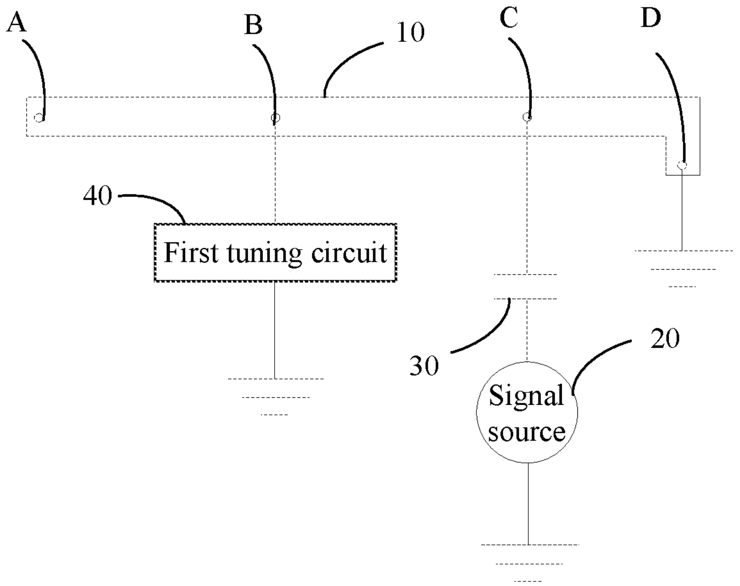
FIG. 1*a* is a first schematic diagram of an antenna structure according to an embodiment of the present disclosure.

The following clearly and describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Terms “first” and “second” in this application are used to distinguish between similar objects, and do not need to be used to describe a specific order or sequence. In addition, terms “include”, “have”, and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, “and/or” used in this application means at least one of the connected objects. For example, A and/or B and/or C represents the following seven cases: Only A exists, only B exists, only C exists, both A and B exist, both B and C exist, both A and C exist, or A, B, and C all exist.

An antenna structure in the embodiments of the present disclosure is described below.

In the embodiments of the present disclosure, the antenna structure may include an antenna radiator, a signal source, a first capacitor, and a first tuning circuit.

The antenna radiator is mainly used for antenna radiation. During specific implementation, in one implementation, the antenna radiator may be a low-frequency antenna radiator. A frequency range that the low-frequency antenna radiator can cover may include 0.7 GHz to 0.96 GHz (Gigahertz). In practical applications, the above frequency range may be divided into several frequency bands: 0.7 GHz to 0.746 GHz (e.g., frequency band B12), 0.79 GHz to 0.86 GHz (e.g., frequency band B20), 0.824 GHz to 0.894 GHz (e.g., frequency band B5), and 0.88 GHz to 0.96 GHz (e.g., frequency band B8), but the frequency bands are not limited thereto.

In another implementation, the antenna radiator may be a medium- and high-frequency antenna radiator. A frequency range that the medium- and high-frequency antenna radiator can cover may include 1.71 GHz to 2.69 GHz. In practical applications, the above frequency range may be divided into several frequency bands: 1.71 GHz to 1.88 GHz (e.g., frequency band B3), 1.88 GHz to 1.92 GHz (e.g., frequency band B39), 1.92 GHz to 2.17 GHz (e.g., frequency band B1), 2.3 GHz to 2.4 GHz (e.g., frequency band B40), and 2.5 GHz to 2.69 GHz (e.g., frequency band B41), but the frequency bands are not limited thereto.

During specific implementation, the antenna radiator may be a metal frame or a metal shell of a communications terminal, or may be a metal body arranged in the housing of the communications terminal; and the material of the antenna radiator may be a Flexible Printed Circuit (FPC) board, Laser Direct Structuring (LDS), stainless steel, magnesium alloy, etc., which are not limited.

The signal source (or feed source) may be used to send and receive signals and provide electromagnetic wave energy.

In the embodiments of the present disclosure, the first capacitor not only has the function of impedance matching, but is also a high-impedance feeding element, which can cause the antenna structure to generate a new resonance manner and optimize a resonant mode excited by the antenna structure. When the first capacitor has a large capacitance value, each resonant mode may be greatly affected, and consequently the antenna structure cannot operate onto a required frequency band. Therefore, in the embodiments of the present disclosure, optionally, a value of the first capacitor is less than a second specific value. Optionally, a value range of the first capacitor may be 0.5 picofarads to 2.7 picofarads. In practical applications, the first capacitor may be a fixed capacitor or a variable capacitor. When the first capacitor is a variable capacitor, resonant frequency can be further changed to improve the flexibility of the resonant frequency.

In this way, connecting a small capacitor at an antenna feed point in series not only changes an antenna resonance generation manner, but can also perform the impedance matching function. In addition, compared with a resonant mode produced by a conventional planar inverted-F antenna (IFA), a resonant mode produced by connecting the small capacitor at the antenna feed point in series may have lower resonant frequency, such that a total length of the antenna radiator can be shortened at the same resonant frequency, thereby reducing the space occupied by the antenna structure in the communications terminal.

The first tuning circuit is mainly used to change an equivalent electrical length of the antenna radiator, thereby changing resonant frequency of each resonant mode. In addition, impedance of the first tuning circuit is adjustable. During specific implementation, the first tuning circuit may be composed of a plurality of switches and matching elements (such as inductors and capacitors), or may be composed of variable capacitors and inductors, which is not limited in the embodiments of the present disclosure.

The following describes arrangements of the antenna radiator, the signal source, the first capacitor, and the first tuning circuit in the embodiments of the present disclosure.

A first terminal of the antenna radiator is grounded. It should be noted that the embodiments of the present disclosure do not limit a grounding manner. In practical applications, the grounding manner may include, but is not limited to, grounding by connecting to a metal shell, a main board ground, or a reference ground. In addition, a second terminal of the antenna radiator is an open-circuit terminal.

The first terminal of the first capacitor and a first terminal of the first tuning circuit each are electrically connected to a connection point of the antenna radiator, a second terminal of the first capacitor are electrically connected to the signal source, and a second terminal of the first tuning circuit is grounded.

In other words, the first capacitor is connected between the connection point of the antenna radiator and the signal source; and the first tuning circuit is connected between the connection point of the antenna radiator and the ground point.

During specific implementation, the first terminal of the first capacitor and the first terminal of the first tuning circuit may be electrically connected to the same connection point or different connection points of the antenna radiator, which may specifically depend on actual requirements, and is not limited in the embodiments of the present disclosure. Optionally, the first terminal of the first capacitor is electrically connected to a first connection point of the antenna radiator, and the second terminal of the first tuning circuit is electrically connected to a second connection point of the antenna radiator; or the first terminal of the first capacitor and the first terminal of the first tuning circuit are electrically connected to the same connection point of the antenna radiator.

When the first terminal of the first capacitor and the first terminal of the first tuning circuit are electrically connected to the same connection point of the antenna radiator, a quantity of feed connection points of the antenna radiator can be reduced, which not only lowers requirements for the structural space of the antenna radiator, but also reduces impact on parasitic parameters of the feed connection points.

In addition, when the first terminal of the first capacitor is electrically connected to the first connection point of the antenna radiator, and the second terminal of the first tuning circuit is electrically connected to the second connection point of the antenna radiator, the first connection point may be arranged between the second terminal of the antenna radiator and the second connection point, or between the first terminal of the antenna radiator and the second connection point, which may specifically depend on actual requirements, and is not limited in the embodiments of the present disclosure.

It should be noted that, if a connection point of the antenna radiator is connected to a signal source, the connection point may be referred to as a feed point or a feeding point.

For ease of understanding the antenna structure in the embodiments of the present disclosure, refer to FIG. 1*a* to FIG. 1*d*.

In antenna structures shown in FIG. 1*a* to FIG. 1*d*, the first terminal of the first capacitor and the first terminal of the first tuning circuit are electrically connected to different connection points of the antenna radiator. In FIG. 1*a* to FIG. 1*d*, the first connection point of the antenna radiator to which the first terminal of the first capacitor is electrically connected is denoted as C, and the second connection point of the antenna radiator to which the second terminal of the first tuning circuit is electrically connected is denoted as B.

Further, in FIG. 1*a*, the first connection point C is arranged between the first terminal (denoted as D in FIG. 1*a* to FIG. 1*d*) of the antenna radiator and the second connection point B. It can be seen that in FIG. 1*a*, a length between the second terminal (denoted as A in FIG. 1*a* to FIG. 1*d*) of the antenna radiator and the second connection point B is less than a length between the second terminal A of the antenna radiator and the first connection point C, that is, the length of AC is greater than the length of AB.

Figure 1B:
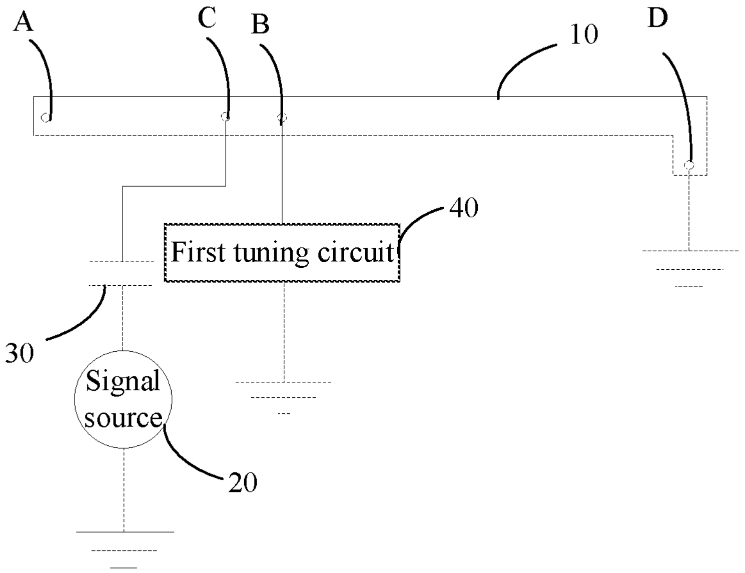
FIG. 1B is a second schematic diagram of an antenna structure according to an embodiment of the present disclosure.
Figure 1C:
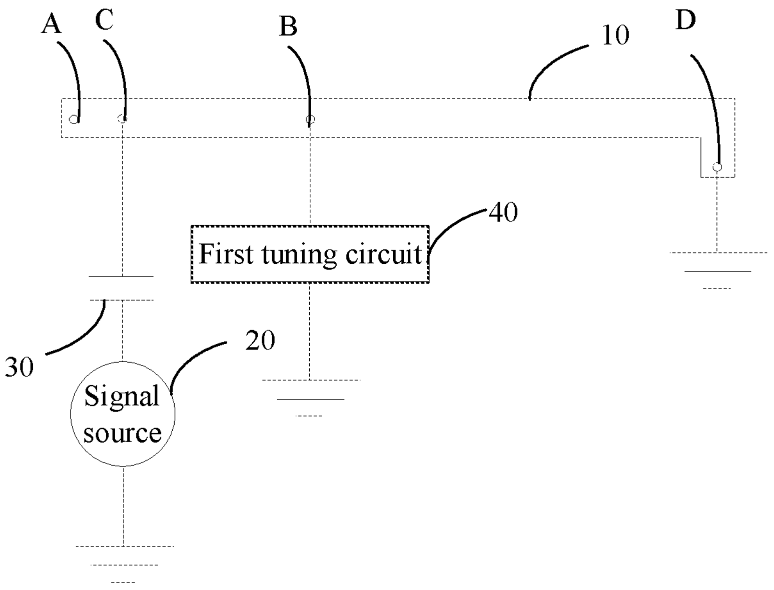
FIG. 1*c* is a third schematic diagram of an antenna structure according to an embodiment of the present disclosure.

In FIG. 1B and FIG. 1*c*, the first connection point C is arranged between the second terminal of the antenna radiator and the second connection point B. It can be seen that in FIG. 1*b* and FIG. 1*c*, a length between the second terminal A of the antenna radiator and the second connection point B is larger than a length between the second terminal A of the antenna radiator and the first connection point C, that is, the length of AC is less than the length of AB. A main difference between FIG. 1B and FIG. 1*c* lies that the first connection point C is close to the second connection point B in FIG. 1B, while the first connection point C is close to the first terminal A of the antenna radiator in FIG. 1*c*.

Figure 1D:
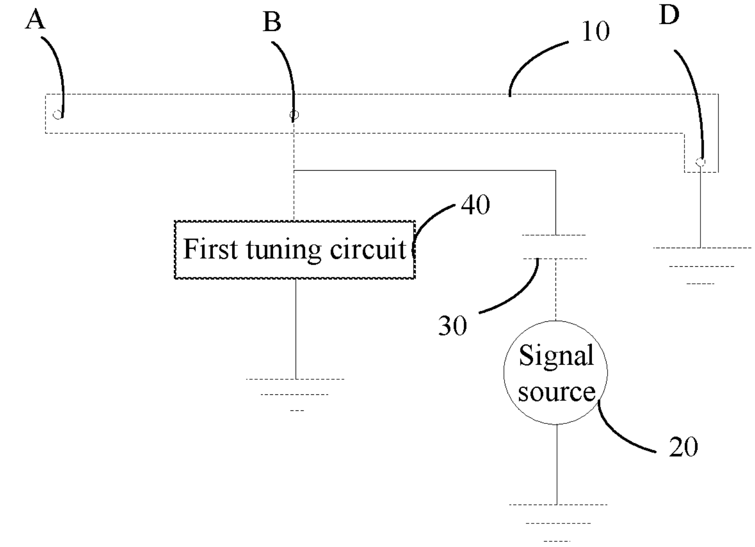
FIG. 1*d* is a fourth schematic diagram of an antenna structure according to an embodiment of the present disclosure.

In FIG. 1*d*, the first terminal of the first capacitor and the first terminal of the first tuning circuit are electrically connected to the same connection point of the antenna radiator, and this connection point is denoted as B.

In FIG. 1*a* to FIG. 1*d*, the antenna radiator is marked as 10, the signal source is marked as 20, the first capacitor is marked as 30, and the first tuning circuit is marked as 40.

As shown in FIG. 1*a* to FIG. 1*d*, the first terminal D of the antenna radiator 10 is grounded, and the second terminal A of the antenna radiator 10 may be an open-circuit terminal. A second terminal of the first capacitor 30 is grounded via the signal source 20, and a second terminal of the first tuning circuit 40 is directly grounded.

In FIG. 1*a* to FIG. 1*d*, the antenna radiator 10 is L-shaped, but it should be understood that the present disclosure does not limit the shape of the antenna radiator 10. For example, in some embodiments, the antenna radiator 10 may also be of a straight-line type or curved type, which may be specifically set depending on actual requirements, and is not limited in the embodiments of the present disclosure.

In addition, the arrangement positions of the connection point B and the connection point C in FIG. 1*a* are only examples, and the arrangement positions of the connection point B and the connection point C are not limited accordingly.

In the embodiments of the present disclosure, antenna impedance of the first terminal of the first capacitor at target frequencies is in the first quadrant of a Smith chart. The target frequencies are at least some frequencies in frequency bands covered by the antenna radiator. Further, the target frequencies are at least two thirds of frequencies in each frequency band covered by the antenna radiator.

For ease of understanding, the division of the quadrants of the Smith chart is described below in conjunction with FIG. 2.

Figure 2:
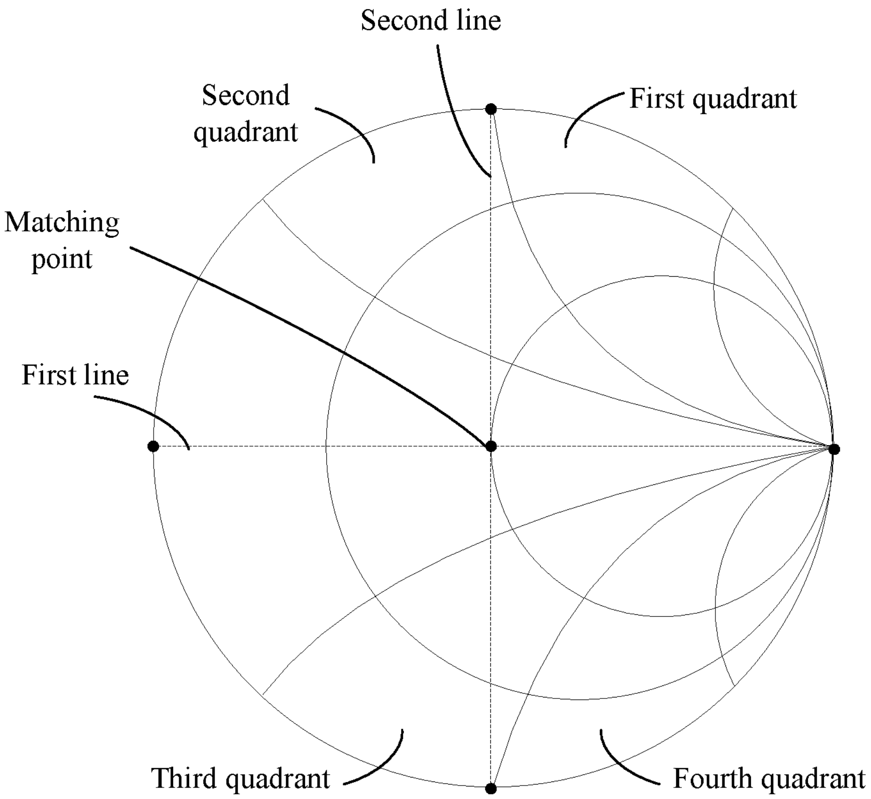
FIG. 2 is a first schematic diagram of a Smith chart according to an embodiment of the present disclosure.

As shown in FIG. 2, a pure resistance line in the Smith chart may be set as a first line, and a straight line formed by two points with a phase of 90 degrees on the outer circumference of the Smith chart may be set as a second line. Then, four regions obtained from division by the first line and the second line are used as the first quadrant, a second quadrant, a third quadrant, and a fourth quadrant.

The first quadrant is a region with inductive reactance and relatively large impedance, and the second quadrant is a region with inductive reactance and relatively small impedance. The third quadrant is a region with capacitive reactance and relatively small impedance, and the fourth quadrant is a region with capacitive reactance and relatively large impedance.

In addition, it should be noted that the orthogonal point of the first line and the second line may be referred to as a matching point or a center point. The matching point can be understood as: matched impedance required by a radio frequency system. When antenna impedance at the second terminal of the first capacitor (that is, antenna impedance at the signal source) matches the matched impedance required by the radio frequency system, that is, when the antenna impedance at the second terminal of the first capacitor is matched to the matching point of the Smith chart, the impedance mismatch loss of the antenna structure can be minimized, and the transmission efficiency can be maximized. For example, if the matched impedance required by the radio frequency system is 50Ω (ohm), when the antenna impedance at the second terminal of the first capacitor is matched to 50Ω, the impedance mismatch loss of the antenna structure can be minimized, and the transmission efficiency can be maximized.

It can be learned from the above that in the embodiments of the present disclosure, the antenna impedance of the first terminal of the first capacitor at the target frequencies is in the first quadrant of the Smith chart, which is a region with inductive reactance and relatively large impedance, and almost no resonant mode or a very poor resonant mode is present in the target frequency bands. Then further, high-impedance feeding of the first capacitor, on the one hand, can cause the antenna structure to generate a new resonance manner and thereby optimize a resonant mode excited by the antenna structure; on the other hand, can match antenna impedance of the second terminal of the first capacitor to be close to a matching point of the Smith chart, such that the problem of the impedance mismatch loss of the antenna can be alleviated, which reduces the impedance mismatch loss and in turn can improve the transmission efficiency of the antenna.

In the embodiments of the present disclosure, in order to achieve the requirement that the antenna impedance of the first terminal of the first capacitor at the target frequencies is in the first quadrant of the Smith chart, a total length of the antenna radiator and arrangement positions of the connection points on the antenna radiator can be defined.

Optionally, a value range of the total length of the antenna radiator is 3/16 wavelength to 3/8 wavelength of a center frequency of a first frequency band in the frequency bands covered by the antenna radiator; and

- a first length between a second terminal of the antenna radiator and a connection point electrically connected to the first tuning circuit is less than 1/4 wavelength of a second frequency band in the frequency bands covered by the antenna radiator, where
- the center frequency of the first frequency band is less than a center frequency of any frequency band other than the first frequency band in the frequency bands covered by the antenna radiator; and the center frequency of the second frequency band is greater than a center frequency of any frequency band other than the second frequency band in the frequency bands covered by the antenna radiator.

For example, if the frequency bands covered by the antenna radiator include B3 (1.71 GHz to 1.88 GHz), B39 (1.88 GHz to 1.92 GHz), B1 (1.92 GHz to 2.17 GHz), B40 (2.3 GHz to 2.4 GHz), and B41 (2.5 GHz to 2.69 GHz), the first frequency band is B3, and the second frequency band is B41.

If the frequency bands covered by the antenna radiator include B12 (0.7 GHz to 0.746 GHz), B20 (0.79 GHz to 0.86 GHz), B5 (0.824 GHz to 0.894 GHz), and B8 (0.88 GHz to 0.96 GHz), the first frequency band is B12, and the second frequency band is B8.

In practical applications, in order to tune a resonant mode of the antenna radiator as low as possible to the first frequency band, the value range of the total length of the antenna radiator is required to be 3/16 wavelength to 3/8 wavelength of the center frequency of the first frequency band in the frequency bands covered by the antenna radiator. Optionally, the total length of the antenna radiator may be required to be close to 1/4 wavelength of any frequency in the first frequency band.

It can be learned that determining the total length of the antenna radiator in the above manner can not only expand the range of frequency bands covered by the antenna radiator, but can also shorten, in comparison with the related art, the total length of the antenna radiator according to the embodiments of the present disclosure, thereby reducing the space occupied by the antenna structure in the communications terminal.

For the setting of the first length of the antenna radiator, because the first capacitor can alleviate impedance mismatch in the second frequency band, in practical applications, in order to tune the resonant mode of the antenna radiator as high as possible to the second frequency band, the first length of the antenna radiator may be required to be less than 1/4 wavelength of the second frequency band.

It should be noted that when the first terminal of the first capacitor is electrically connected to the first connection point of the antenna radiator, and the second terminal of the first tuning circuit is electrically connected to the second connection point of the antenna radiator, the first length between the second terminal of the antenna radiator and the second connection point is less than or equal to 1/4 wavelength of the second frequency band, that is, the length of AB in FIG. 1*a* to FIG. 1*d* is less than or equal to 1/4 wavelength of the second frequency band. During specific implementation, the length of AB may be less than or equal to 1/4 wavelength of any frequency in the second frequency band.

It can be learned that determining the first length of the antenna radiator in the above manner can not only expand the range of frequency bands covered by the antenna radiator, but can also increase, in comparison with the related art, the first length according to the embodiments of the present disclosure.

Further, when the first terminal of the first capacitor is electrically connected to the first connection point of the antenna radiator, and the second terminal of the first tuning circuit is electrically connected to the second connection point of the antenna radiator, an absolute difference between the total length and a second length between the second terminal of the antenna radiator and the first connection point is greater than a first specific value. In other words, the second length is less than the total length by at least the first specific value, that is, the length of AC is less than the length of AD by at least the first specific value in FIG. 1*a* to FIG. 1*d*.

Determining the first specific value may be related to a type of the antenna radiator. Specifically, if the antenna radiator is a low-frequency antenna radiator, the first specific value may be 4 mm; and if the antenna radiator is a medium- and high-frequency antenna radiator, the first specific value may be 1 mm. However, it should be understood that the present disclosure does not limit the first specific value, which may be specifically determined depending on actual requirements.

It should be understood that when the first terminal of the first capacitor and the first terminal of the first tuning circuit are electrically connected to the same connection point of the antenna radiator, as shown in FIG. 1*d*, a single feed point B is set on the antenna radiator.

In this way, determining the total length of the antenna radiator and the arrangement positions of the connection points of the antenna radiator in the above manner helps the antenna impedance of the first terminal of the first capacitor at the target frequencies be in the first quadrant of the Smith chart, and can in turn cause the antenna structure to generate a new resonance manner and optimize a resonant mode excited by the antenna structure; in addition, the problem of the impedance mismatch loss of the antenna is alleviated.

During specific implementation, optionally, when the antenna radiator is a medium- and high-frequency antenna radiator, the value range of the total length is 16 mm to 22 mm; a value range of the first length is 0 mm to 12 mm; and a value range of the second length is 0 mm to 18 mm; and when the antenna radiator is a low-frequency antenna radiator, the value range of the total length is 40 mm to 60 mm; the value range of the first length is 0 mm to 35 mm; and the value range of the second length is 0 mm to 50 mm.

It should be noted that in practical applications, specific values of the total length, the first length, and the second length of the antenna radiator may depend on actual conditions, and are not limited in the embodiments of the present disclosure. However, it should be understood that the total length of the antenna radiator is always greater than the first length and the second length.

Optionally, when the antenna radiator is a medium- and high-frequency antenna radiator, the value range of the total length is 18 mm to 20 mm; a value range of the first length is 6 mm to 8 mm; and a value range of the second length is 14 mm to 16 mm; and when the antenna radiator is a low-frequency antenna radiator, the value range of the total length is 40 mm to 60 mm; the value range of the first length is 25 mm to 30 mm; and the value range of the second length is 33 mm to 45 mm.

In this way, determining the total length of the antenna radiator and the arrangement positions of the connection points of the antenna radiator in the above manner can cause the antenna impedance of the first terminal of the first capacitor at the target frequencies to be in the first quadrant of the Smith chart, and can in turn cause the antenna structure to generate a new resonance manner and optimize a resonant mode excited by the antenna structure; in addition, the problem of the impedance mismatch loss of the antenna is alleviated.

It is considered that in some scenarios, simply determining the total length of the antenna radiator and the arrangement positions of the connection points of the antenna radiator cannot cause the antenna impedance of the first terminal of the first capacitor at the target frequencies to be in the first quadrant of the Smith chart. For example, when the antenna radiator is a medium- and high-frequency antenna radiator, and a space between the connection point at which the antenna radiator is electrically connected to the first terminal of the first capacitor and the connection point at which the antenna radiator is electrically connected to the first terminal of the first tuning circuit is less than a fourth specific value, e.g., 3 mm, the first tuning circuit may cause antenna impedance of the first terminal of the first capacitor in B40/B41 to enter the boundary of the first quadrant and the second quadrant of the Smith chart, but cannot cause the antenna impedance of the first terminal of the first capacitor at the target frequencies to be in the first quadrant of the Smith chart.

Therefore, in order to meet the requirement that the antenna impedance of the first terminal of the first capacitor at the target frequencies is in the first quadrant of the Smith chart, optionally, the antenna structure further includes a phase adjustment circuit, and the first terminal of the first capacitor is electrically connected to the connection point of the antenna radiator via the phase adjustment circuit, where a phase adjustment range of the phase adjustment circuit includes zero.

Figure 3A:
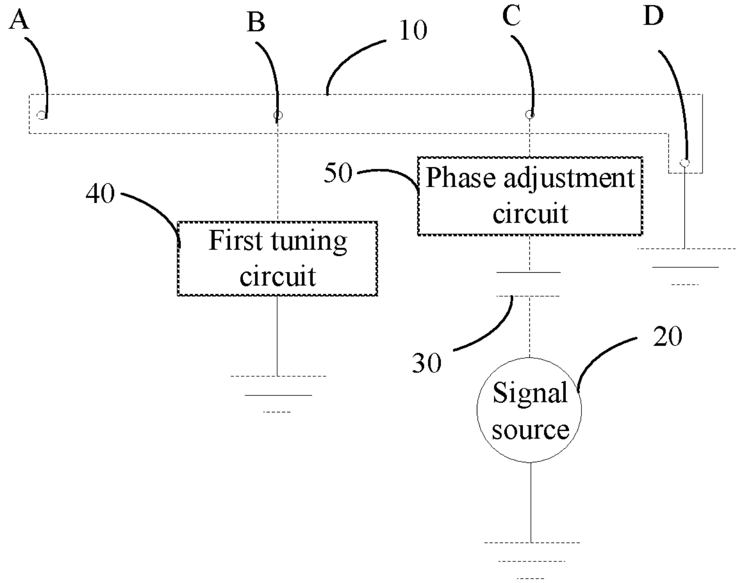
FIG. 3*a* is a fifth schematic diagram of an antenna structure according to an embodiment of the present disclosure.
Figure 3B:
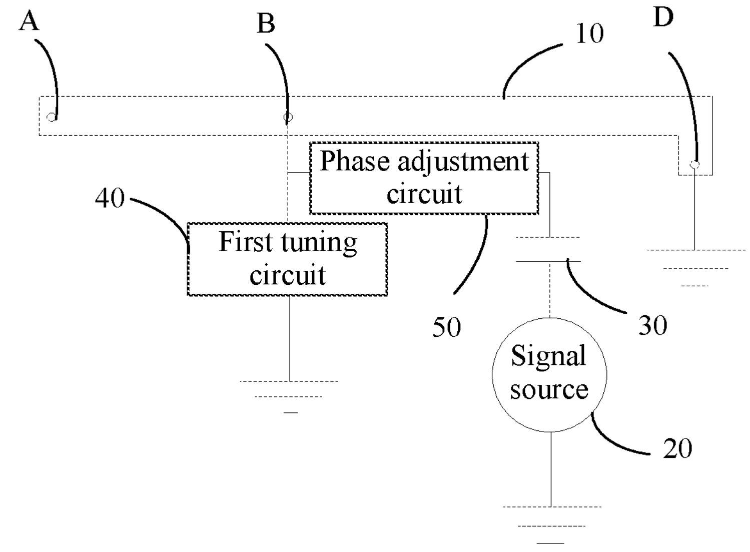
FIG. 3*b* is a sixth schematic diagram of an antenna structure according to an embodiment of the present disclosure.

For ease of understanding, refer to FIG. 3*a* and FIG. 3*b* together.

The main difference between FIG. 3*a* and FIG. 1*a* lies that in FIG. 1*a*, the first terminal of the first capacitor 30 is directly electrically connected to the first connection point C, while in FIG. 3*a*, the first terminal of the first capacitor 30 is electrically connected to the first connection point C via the phase adjustment circuit 50.

The main difference between FIG. 3*b* and FIG. 1*d* lies in that in FIG. 1*d*, the first terminal of the first capacitor 30 is directly electrically connected to the connection point B, while in FIG. 3*b*, the first terminal of the first capacitor 30 is electrically connected to the connection point B via the phase adjustment circuit 50.

During specific implementation, a phase adjustment circuit may be added at the connection point electrically connected to the first terminal of the first capacitor. The phase adjustment circuit may be implemented by connecting only a small capacitor (for example, 0.3 pf to 0.7 pf) in parallel to the ground, or by first connecting a small inductor in series and then connecting a small capacitor in parallel (for example, connecting 2 nH to 4 nH in series and connecting 0.3 pf to 0.7 pf in parallel), or by directly lengthen a feeder line between an antenna and a feed point to adjust the impedance to the first quadrant.

Certainly, in some embodiments, a phase adjustment value of the phase adjustment circuit may be 0, that is, the phase adjustment circuit does not adjust a phase.

It should be understood that a specific form and a specific phase adjustment value of the phase adjustment circuit may be selected depending on actual debugging conditions. In addition, the present disclosure does not limit a circuit structure used by the phase adjustment circuit to achieve a specific phase adjustment value.

When the first terminal of the first capacitor and the first terminal of the first tuning circuit are electrically connected to the same connection point of the antenna radiator, as shown in FIG. 3*b*, during specific implementation, the first tuning circuit 40 may be first connected in parallel at the point B, and then the phase adjustment circuit 50 is connected in series. That is, the first tuning circuit 40 is connected between the point B and the main board ground, while the phase adjustment circuit 50 is connected between the point B and the first capacitor 30.

In this way, adding the phase adjustment circuit can adjust the antenna impedance of the first terminal of the first capacitor at the target frequencies to the first quadrant of the Smith chart, thereby meeting the requirement that the antenna impedance of the first terminal of the first capacitor at the target frequencies is in the first quadrant of the Smith chart; and can in turn cause the antenna structure to generate a new resonance manner and optimize a resonant mode excited by the antenna structure; in addition, the problem of the impedance mismatch loss of the antenna is alleviated.

In the embodiments of the present disclosure, optionally, the antenna structure further includes a second tuning circuit, a first terminal of the second tuning circuit is electrically connected to the first terminal of the first capacitor or the second terminal of the first capacitor, and a second terminal of the second tuning circuit is grounded.

In the embodiments of the present disclosure, the second tuning circuit may be used to implement dual-resonance Carrier Aggregation (CA). In this way, adding the second tuning circuit can implement the dual-resonance CA. Alternatively, the second tuning circuit may be used to adjust a resonant frequency of a target resonant mode of the antenna structure, improve an antenna standing wave ratio of a target frequency band of the target resonant mode, and reduce the mismatch loss. In this way, the newly added second tuning circuit can reduce the mismatch loss, and further can improve the transmission efficiency of the antenna.

Optionally, the second tuning circuit includes a tuning element and a first matching element connected in series, where a first terminal of the first matching element is electrically connected to the first terminal of the first capacitor or the second terminal of the first capacitor, and a second terminal of the first matching element is grounded via the tuning element.

Figure 4:
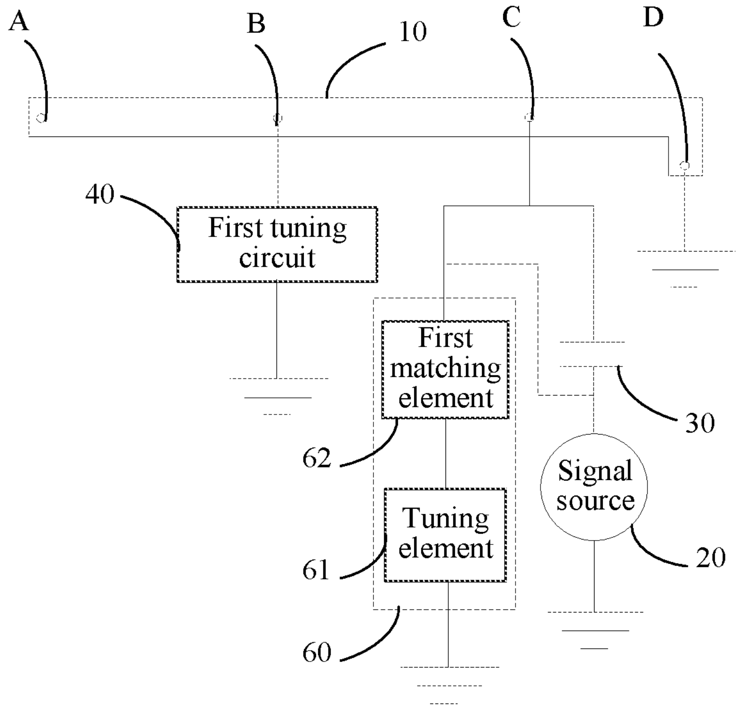
FIG. 4 is a seventh schematic diagram of an antenna structure according to an embodiment of the present disclosure.

For ease of understanding, refer to FIG. 4 as well. In FIG. 4, the antenna structure further includes a second tuning circuit 60, where the second tuning circuit 60 includes a tuning element 61 and a first matching element 62 connected in series, where a first terminal of the first matching element 62 may be electrically connected to a first terminal of the first capacitor 30 (connected by a solid line as shown in FIG. 4), or a first terminal of the first matching element 62 may be electrically connected to a second terminal of the first capacitor 30 (connected by a dashed line as shown in FIG. 4); and a second terminal of the first matching element 62 is grounded via the tuning element 61.

It should be noted that, in other implementations, the connection sequence of the tuning element 61 and the first matching element 62 can be exchanged. In other words, the embodiments of the present disclosure do not limit the serial connection sequence of the tuning element 61 and the first matching element.

The following describes the specific structure and function of the second tuning circuit.

Optionally, the tuning element is a first switch or a variable capacitor; and the first matching element includes a second capacitor and/or a first inductor, where when the first matching element is the second capacitor or the first inductor, the first terminal of the first matching element is electrically connected to the first terminal of the first capacitor or the second terminal of the first capacitor; and when the first matching element includes the second capacitor and the first inductor connected in parallel, the first terminal of the first matching element is electrically connected to the first terminal of the first capacitor.

During specific implementation, in one implementation, optionally, the tuning element is the first switch, and the first matching element includes the second capacitor and/or the first inductor, where the first terminal of the first matching element is electrically connected to the first terminal of the first capacitor or the second terminal of the first capacitor, and a second terminal of the second capacitor is electrically connected to the first switch.

In this implementation, the second tuning circuit is composed of the first switch and the second capacitor connected in series, or is composed of the first switch and the first inductor connected in series, which can be used to adjust the resonant frequency of the target resonant mode of the antenna structure, improve the antenna standing wave ratio of the target frequency band of the target resonant mode, and reduce the mismatch loss.

During specific implementation, the second capacitor or the first inductor is connected by controlling the first switch to be connected, such that the resonant frequency of the target resonant mode of antenna radiator can be reduced. The target resonant mode may be presented as H2 or H3, a target frequency band of H2 may be B39, and a target frequency band of H3 may be B40.

In another implementation, optionally, the tuning element is the first switch, and the first matching element is composed of the first capacitor and the second inductor connected in parallel, where the first terminal of the first matching element is electrically connected to the first terminal of the first capacitor, and a second terminal of the second capacitor is electrically connected to the first switch.

In this implementation, the first matching element is mainly used to generate different impedance characteristics with different frequencies, and therefore may be referred to as a frequency-dependent impedance element.

The second tuning circuit is composed of the first switch, and the first inductor and the second capacitor connected in parallel. Therefore, the second tuning circuit in this implementation may be used to implement dual-resonance CA.

During specific implementation, the on state of the first tuning circuit and the first switch can be controlled such that the antenna radiator generates two resonant modes simultaneously, to cover two different frequency bands at the same time. For example, B39 and B41 or B3 and B40 can be covered at the same time when the frequency bands covered by the antenna radiator include B3, B39, B1, B40, and B41.

In practical applications, the first matching element may be equivalent to a capacitor or high impedance (such as an open circuit, a very small capacitor, or a very large inductor). For example, when the frequency bands covered by the antenna radiator include B3, B39, B1, B40, and B41, the first matching element may be equivalent to a capacitor in B40 or B41, and a value range of the equivalent capacitor may be 0.3 picofarads to 1.2 picofarads; and the first matching element may be adjusted in B3 or B39 according to a resonant frequency of a new resonant mode generated by the antenna radiator, and is equivalent to high impedance (such as an open circuit, a very small capacitor, or a very large inductor).

The following describes the specific structure of the first tuning circuit in the embodiments of the present disclosure.

In one implementation, optionally, the first tuning circuit is composed of a variable capacitor; or the first tuning circuit is composed of a variable capacitor and a fixed inductor connected in series or in parallel.

In other words, in practical applications, the first tuning circuit may be composed of an independent variable capacitor, or may be composed of a variable capacitor and a fixed inductor, and the variable capacitor and the fixed inductor may be connected in series or in parallel.

It should be noted that a specific value range of the variable capacitor in the first tuning circuit and a specific inductance value of the fixed inductor in the first tuning circuit are related to an operating frequency band of the antenna, which is not limited in the embodiments of the present disclosure.

In another implementation, optionally, the first tuning circuit includes a first sub-tuning circuit and a second sub-tuning circuit connected in parallel, where when the first sub-tuning circuit is in a first working state and the second sub-tuning circuit is in the first working state, the antenna radiator generates a first resonant mode;

when the first sub-tuning circuit is in a second working state and the second sub-tuning circuit is in the first working state, the antenna radiator generates a second resonant mode;

when the first sub-tuning circuit is in the first working state and the second sub-tuning circuit is in the second working state, the antenna radiator generates a third resonant mode; and when the first sub-tuning circuit is in the second working state and the second sub-tuning circuit is in the second working state, the antenna radiator generates a fourth resonant mode, where resonant frequencies of the first resonant mode, the second resonant mode, the third resonant mode, and the fourth resonant mode are in ascending order. In other words, F1<F2<F3<F4, where F1 represents the resonant frequency of the first resonant mode, F2 represents the resonant frequency of the second resonant mode, F3 represents the resonant frequency of the third resonant mode, and F4 represents the resonant frequency of the fourth resonant mode.

During specific implementation, the first working state may be an off state, and the second working state may be an on state, but they are not limited to thereto.

For example, when the frequency bands covered by the antenna radiator include B3, B39, B1, B40, and B41, the first resonant mode may be H1, in which case the antenna radiator covers B3; the second resonant mode may be H2, in which case the antenna radiator covers B39 and B1; the third resonant mode may be H3, in which case the antenna radiator covers B40; and the fourth resonant mode may be H4, in which case the antenna radiator covers B41.

It can be learned that in the embodiments of the present disclosure, the multi-band coverage of the antenna radiator can be achieved by using only two sub-tuning circuits. Compared with the related art in which the multi-band coverage of the antenna radiator can be achieved only by using three or more sub-tuning circuits, the embodiments of the present disclosure can not only reduce a quantity of sub-tuning circuits, thereby reducing the costs of the tuning circuits, but also reduce the loss of the tuning circuits and improve the antenna performance.

Optionally, the first sub-tuning circuit includes a second switch and a second matching element, and the second sub-tuning circuit includes a third switch and a third matching element, where when the second switch and the third switch are both in an off state, the antenna radiator generates the first resonant mode;

when the second switch is in an on state and the third switch is in the off state, the antenna radiator generates the second resonant mode;

when the second switch is in the off state of and the third switch is in the on state, the antenna radiator generates the third resonant mode; and when the second switch and the third switch are both in the on state, the antenna radiator generates the fourth resonant mode.

In this implementation, the first sub-tuning circuit is composed of the second switch and the second matching element, and the second sub-tuning circuit is composed of the third switch and the third matching element. For ease of understanding, refer to FIG. 5 as well.

Figure 5:
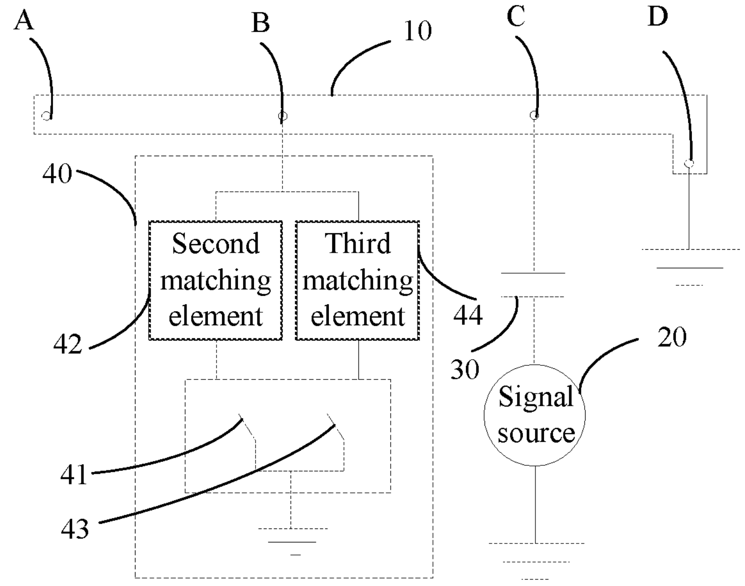
FIG. 5 is an eighth schematic diagram of an antenna structure according to an embodiment of the present disclosure.

In FIG. 5, the first tuning circuit 40 includes a second switch 41, a second matching element 42, a third switch 43, and a third matching element 44, where the second switch 41 and the second matching element 42 form the first sub-tuning circuit, the third switch 43 and the third matching element 44 form the second sub-tuning circuit, and the first sub-tuning circuit and the second sub-tuning circuit are connected in parallel.

It should be noted that in practical applications, in order to reduce the area occupied by the second switch 41 and the third switch 43 and reduce the switch costs, the second switch 41 and the third switch 43 may be integrated on one module.

During specific implementation, when the second switch 41 and the third switch 43 are both in the off state, the medium- and high-frequency antenna radiator generates the resonant mode H1, which may be used to cover B3;

when the second switch 41 is in the on state and the third switch 43 is in the off state, the medium- and high-frequency antenna radiator generates the resonant mode H2, which may be used to cover B39 and B1;

when the second switch 41 is in the off state and the third switch 43 is in the on state, the medium- and high-frequency antenna radiator generates the resonant mode H3, which may be used to cover B40; and when the second switch 41 and the third switch 43 are both in the on state, the medium- and high-frequency antenna radiator generates the resonant mode H4, which may be used to cover B41.

Further, the second matching element includes a second inductor, and the third matching element includes a third inductor, where a value of the second inductor is greater than a value of the third inductor.

In this way, the frequency band covered by the antenna radiator when the second switch 41 is in the on state and the third switch 43 is in the off state is different from the frequency band covered by the antenna radiator when the second switch 41 is in the off state and the third switch 43 is in the on state, and the resonant frequency of the second resonant mode generated by the antenna radiator when the second switch 41 is in the on state and the third switch 43 is in the off state is lower than the resonant frequency of the third resonant mode generated by the antenna radiator when the second switch 41 is in the off state and the third switch 43 is in the on state.

In addition, when the second switch 41 and the third switch 43 are both in the on state, the second inductor is connected in parallel with the third inductor, which can further reduce the inductance, so that the antenna radiator can cover a higher frequency band.

During specific implementation, optionally, a value range of the second inductor is 8 nanohenries (nH) to 22 nanohenries, and a value range of the third inductor is 1 nanohenry to 5.6 nanohenries.

It can be learned that, compared with the related art, the embodiments of the present disclosure can increase the inductance of the third inductor, such that the loss when the third switch is on can be reduced, and the switch loss of the antenna structure can be further reduced, thereby improving the antenna performance in the B40/B41.

It should be noted that specific inductance values of the second inductor and the third inductor are related to an operating frequency band of the antenna. For example, inductance values for the low-frequency antenna and the medium- and high-frequency antenna are different, which is not limited in the embodiments of the present disclosure.

It should be noted that the various optional implementations described in the embodiments of the present disclosure can be implemented in combination with each other or can be implemented separately, which is not limited in the embodiments of the present disclosure.

For ease of understanding, example descriptions are as follows:

Embodiment 1

Figure 6:
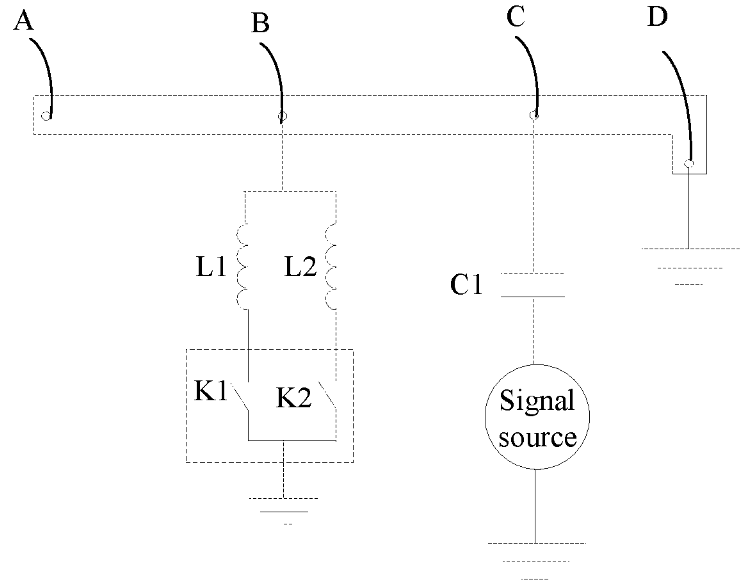
FIG. 6 is a ninth schematic diagram of an antenna structure according to an embodiment of the present disclosure.

For an antenna structure of Embodiment 1, reference may be made to FIG. 6. It should be noted that this embodiment is described by taking a medium- and high-frequency antenna radiator as an example of an antenna radiator.

In FIG. 6, a small capacitor C1 is connected in series at a feed point C of the antenna radiator to achieve antenna bandwidth coverage. A value range of C1 may be 0.5 pf to 2.7 pf, and optionally, the value range of C1 may be 0.8 pf to 1.5 pf. It should be understood that C1 is equivalent to the foregoing first capacitor.

A first tuning circuit includes K1, K2, L1, and L2. It should be understood that K1 is equivalent to the foregoing second switch, K2 is equivalent to the foregoing third switch, L1 is equivalent to the foregoing second inductor, and L2 is equivalent to the foregoing third inductor.

During specific implementation, when K1 and K2 are both off (that is, in an off state), the medium- and high-frequency antenna radiator generates a resonant mode H1, which may be used to cover B3; when K1 is on, the inductor L1 is loaded at a point B, where a value range of L1 may be 8 nH to 22 nH, and optionally, the value range of L1 may be 10 nH to 15 nH, and the medium- and high-frequency antenna radiator generates a resonant mode H2, which may be used to cover B39 and B1; when K2 is on, a value range of L2 may be 1 nH to 5.6 nH, and optionally, the value range of L2 may be 1.5 nH to 3.3 nH, and the medium- and high-frequency antenna radiator generates a resonant mode H3, which may be used to cover B40; when K1 and K2 are both on, the inductance is equal to L1 in parallel with L2 and is further reduced, and the medium- and high-frequency antenna radiator generates a resonant mode H4, which may be used to cover B41.

In FIG. 6, for the antenna structure, a phase adjustment circuit is not shown, and in this case, the phase adjustment circuit is "directly connected" inside.

Figure 7:
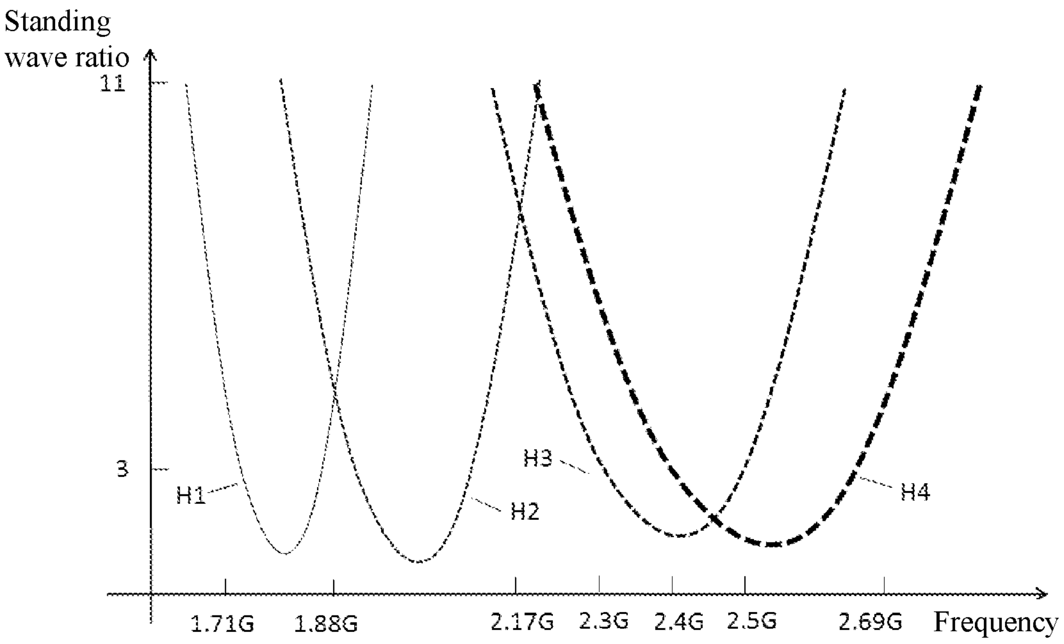
FIG. 7 is a first schematic diagram of antenna standing wave ratio coverage according to an embodiment of the present disclosure.

For a schematic diagram of antenna standing wave ratio coverage, reference may be made to FIG. 7. In FIG. 7, as the inductance at the point B decreases, the movement of H1→H2→H3→H4 occurs accordingly, and the resonant frequency of the antenna increases. However, it can be seen that none standing wave ratios of H1/H2/H3/H4 in the frequency bands B3/B1/B40/B41 has become higher on the whole. It can be learned that this embodiment of the present disclosure significantly alleviates the problem of impedance mismatch of the antenna.

According to the antenna structure of this embodiment, the small capacitor C1 is connected in series at the feed point C, which directly excites the resonant modes H1 and H2, and also alleviates the impedance mismatch of H3/H4 in the frequency bands B40/B41; in addition, the antenna structure of this embodiment requires that the antenna impedance at the point C is in the first quadrant of the Smith chart in most of the frequency bands B3/B1/B39/B40/B41. However, in the related art, the antenna structure uses an equivalent small inductance effect of some sections of the antenna radiator to generate a resonant mode, and uses a matching circuit of a feed path to optimize it to 50 ohms.

Figure 8A:
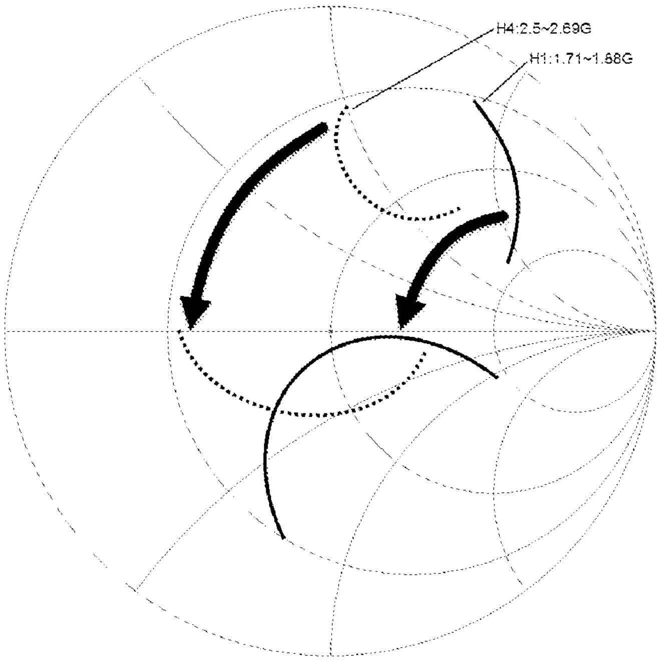
FIG. 8*a* is a second schematic diagram of a Smith chart according to an embodiment of the present disclosure.
Figure 8B:
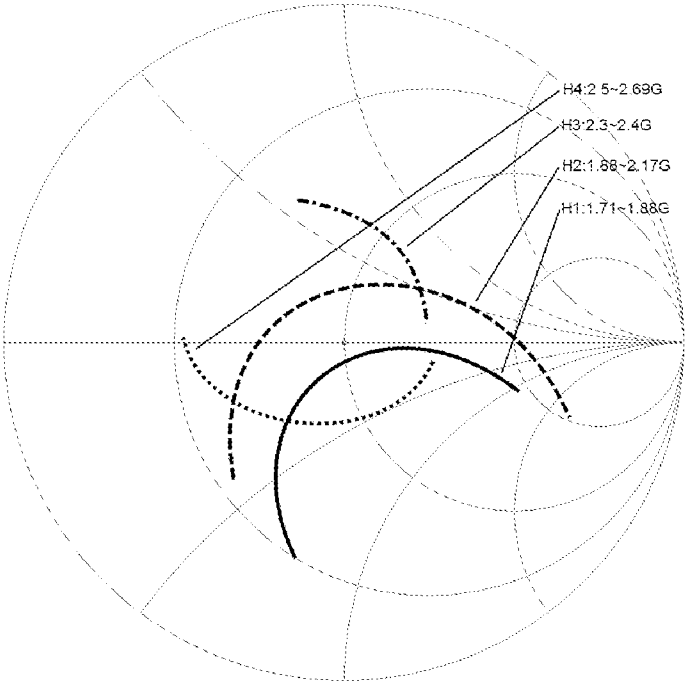
FIG. 8*b* is a third schematic diagram of a Smith chart according to an embodiment of the present disclosure.

For ease of understanding, refer to FIG. 8*a* and FIG. 8*b* together.

FIG. 8*a* is a schematic diagram of an impedance change of antenna impedance of the first terminal of C1 in the frequency bands B3/B41 after passing through C1. It should be understood that in FIG. 8*a*, the solid curve of antenna impedance represents antenna impedance of the first terminal of C1 in the frequency bands B3/B41, and the dotted curve of antenna impedance represents antenna impedance after the antenna impedance of the first terminal of C1 in the frequency bands B3/B41 passes through C1, that is, antenna impedance of the second terminal of C1 in the frequency bands B3/B41. It can be seen from FIG. 8*a* that the antenna impedance of the first terminal of C1 in the frequency bands B3/B41 is in the first quadrant of the Smith chart. At this time, the antenna impedance for B3 is in a high-impedance area of the inductive region, there is no evident resonant mode in the frequency band B3 (the minimum standing wave ratio in the frequency band is greater than 5), and the resonant mode is excited after the high impedance of C1 is fed. However, at this time, B41 already has evident resonant mode characteristics (the minimum standing wave ratio in the frequency band is less than 4), but they are very poor, and are close to the matching point of the Smith chart after the impedance matching by C1. It can be seen that after the impedance matching by C1, it not only excites the resonant modes H1/H2, but also alleviates the impedance mismatch problem for B40/B41.

FIG. 8*b* shows antenna impedance at a signal source, that is, the second terminal of C1, in the frequency bands covered by the antenna radiator according to an embodiment of the present disclosure. It can be seen from FIG. 8*b* that the antenna impedance of the second terminal of C1 in all the frequency bands covered by the antenna radiator is close to the matching point of the Smith chart, such that the problem of antenna impedance mismatch can be alleviated.

It should be noted that the opening direction of each antenna impedance curve is merely an example (for example, the opening of the impedance curve of H1 in the frequency band B3 may face left, and the opening of the impedance curve of H4 in the frequency band B41 may face upward), and may vary depending on different positions of the feed point. This is not limited in this embodiment of the present disclosure.

In this embodiment, in order to tune H4 as high as possible to B41, the length of AB is required to be less than ¼ wavelength of B41, and generally is 0 mm to 12 mm, with an optional value of 6 mm to 8 mm. Compared with the related art, the length of the AB section in this embodiment may be longer. For example, the maximum length of AB in the related art is 7 mm, while the maximum length in this embodiment may be 12 mm. In addition, the inductive value of L2 may be made larger. For example, it is 0 nH in the related art, while it is 3 nH in this embodiment.

In this way, the increase in the length of AB can reduce the loss caused when the switch is turned off, and the increase in the inductive value of L2 can reduce the loss caused when the switch is turned on. In addition, this embodiment can implement multi-band coverage of the antenna radiator using only two sub-tuning circuits, such that a quantity of switches can be reduced, and the loss of the switches can be reduced.

The reasons why the AB section can be set longer than that in the related art may include: 1. The total length of the AD section has been shortened, and the inductance required for tuning to B41 can be larger; and 2. C1 can alleviate the mismatch for B41.

In addition, different from the related art, in order to tune H1 as low as possible to B3, this embodiment requires the antenna length of the AD section to be close to ¼ wavelength of B3, and is about 16 mm to 22 mm, with an optional value of 18 mm to 20 mm. Therefore, compared with the related art, the total length of the antenna in this embodiment can be smaller, that is, the antenna space occupied is smaller. The reason why the AD section in this embodiment can be set shorter than that in the related art is that: connecting the C1 in series at the feed point enables the antenna structure to generate a new resonant mode and thereby optimize the resonant mode excited by the antenna structure, making the resonant frequency of the resonant mode lower. As such, at the same resonant frequency, the length of AD can be shortened because the C1 is connected in series in this embodiment.

The length of AC is required to be at least 1 mm less than that of AD, and is generally 0 mm to 18 mm. In other words, the length of AC may be greater than, equal to, or less than that of AB, and its optional value is 14 mm to 16 mm.

In addition, B and C may share one feed point, that is, there is a single feed point. In this case, the length of AB is required to be less than ¼ wavelength of B41, and is generally 0 mm to 12 mm, with a typical value of 6 mm to 8 mm, such that a quantity of feeding connection points can be reduced, which not only reduces the requirement for structural space, but also reduces impact on parasitic parameters of the feeding connection points.

In this embodiment, the length of CD will significantly affect the resonant frequency of the antenna radiator. Specifically, a decrease in the length of CD will significantly increase the resonant frequencies for the H1/H2/H3. The CD length in the related art has little impact on the resonant frequency.

It should be noted that when BC<3 mm, the first tuning circuit may cause the impedance for B40/B41 to enter the boundary of the first quadrant and the second quadrant. At this time, it is necessary to add a phase adjustment circuit at the point C. Its implementation may be connecting only a small capacitor (for example, 0.3 pf to 0.7 pf) in parallel to the ground, or first connecting a small inductor in series and then connecting a small capacitor in parallel (for example, connecting 2 nH to 4 nH in series and connecting 0.3 pf to 0.7 pf in parallel), or directly lengthening a feeder line between an antenna and a feed point to adjust the impedance for B40/B41 to the first quadrant. A specific value inside the phase adjustment circuit may be selected depending on actual debugging conditions. When B and C share the feed point, the first tuning circuit should be first connected in parallel at the point B, and then the phase adjustment circuit is connected in series (that is, a switch circuit is connected between the point B and the main board ground, and the phase adjustment circuit is added between the point B and the capacitor).

It should be noted that if an inductor or a capacitor is preloaded at the point B or the point C, the length of AD may be further lengthened or shortened.

In addition, the above antenna dimension requirements are only examples. In practical applications, as antenna conditions change in a communications terminal, such as the size of an antenna clearance, the addition of a large metal device, high-dielectric materials such as a plastic/printed circuit board (Printed Circuit Board, PCB), and an antenna feeder line to the antenna area, etc. will cause a great change in the length of the antenna. In addition, there are differences in size with applications to different terminal devices. The dimension requirements need to be adjusted depending on the actual antenna conditions.

The antenna structure in this embodiment can be applied to a "full screen" mobile terminal, and a metal outer frame is used as the antenna radiator.

In practical applications, an antenna radiation fracture may be 1.5 mm, and the antenna is about 1.5 mm away from the metal ground of the entire mobile terminal (commonly known as an antenna clearance distance), and is only 1.2 mm away from the screen (the screen has significant absorption of about 0.8 dB to 1.5 dB of the antenna efficiency at this time). AD=18.5 mm, AC=15.5 mm, AB=7 mm, L1=13 nH, L2=2.7 nH, and C1=1 pf. When K1 and K2 are both off, the antenna generates the resonant mode H1; when K1 is on, the resonant mode H2 is generated; when K2 is on, the resonant mode H3 is generated; and when K1 and K2 are both on, the resonant mode H4 is generated.

Figure 9:
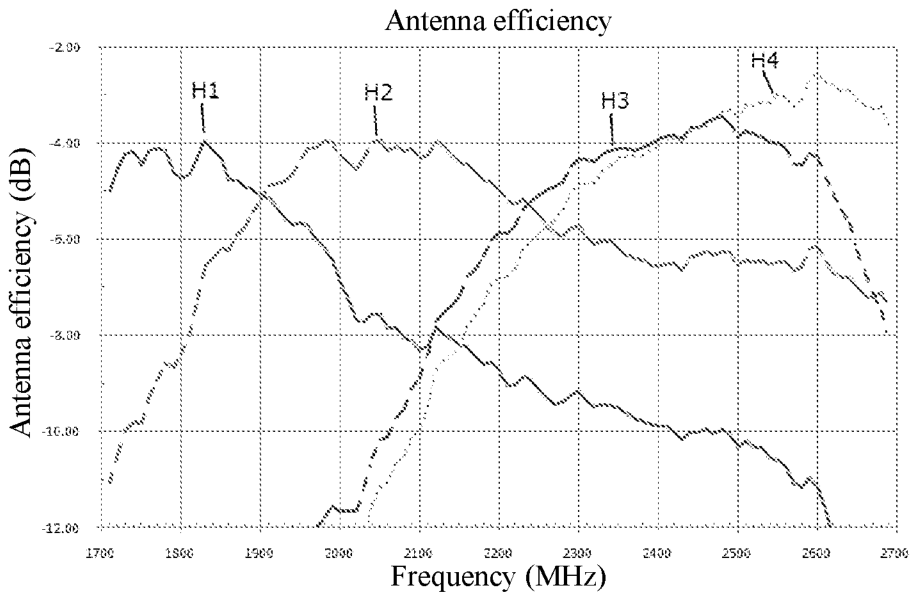
FIG. 9 is a schematic diagram of antenna efficiency according to an embodiment of the present disclosure.

For the frequency fine-tuning and electrostatic protection, an inductor of 30 nH may be pre-connected in parallel at the point B. In order to slightly optimize the standing wave ratio for H4, a 0.3 pf capacitor may be pre-connected in parallel at the point C. The antenna efficiency in free space may be shown in FIG. 9. The peak antenna efficiency can reach about −4 dB, and the average efficiency in the frequency bands B3/B39/B1/B40/B41 is −4.4 dB/−5 dB/−4.3 dB/−4.2 dB/−3.1 dB, meeting the antenna efficiency requirements of the mobile terminal, and the antenna is a high-performance antenna.

Embodiment 2

The main difference between this embodiment and Embodiment 1 lies in that a second tuning circuit is newly added, and the second tuning circuit in this embodiment is mainly used to implement dual-resonance CA.

Figure 10:
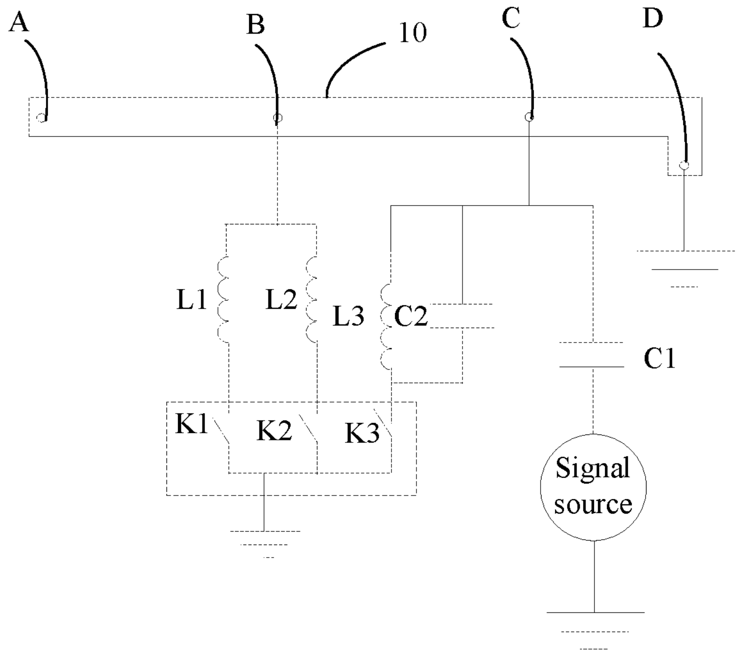
FIG. 10 is a tenth schematic diagram of an antenna structure according to an embodiment of the present disclosure.

As shown in FIG. 10, the second tuning circuit in this embodiment includes K3, L3, and C2. K3 is equivalent to the foregoing first switch, L3 is equivalent to the foregoing first inductor, and C2 is equivalent to the foregoing second capacitor.

During specific implementation, when K1 is on, K2 is not on (that is, in the H1 or H2 state), and K3 is on, the antenna radiator may generate two new resonant modes H5 and H6, which exist at the same time and can be used to cover the CA requirements for B39 and B41. When neither K1 nor K2 is on and only K3 is on, the antenna radiator may be used to cover the CA requirements for B3 and B40.

The L3 and C2 connected in parallel may be equivalent to a capacitor in the frequency band B40 or B41, and the capacitor generally needs to be 0.3 pf to 1.2 pf; the L3 and C2 connected in parallel may be adjusted according to the resonant frequency of H5 in the frequency band B3/B39. For example, it is equivalent to high impedance (an open circuit, a very small capacitor, or a very large inductor).

In practical applications, in order to reduce the space occupied by the switches and reduce the cost of the switches, K1, K2, and K3 may be integrated on one module, and the common terminal is grounded.

Figure 11:
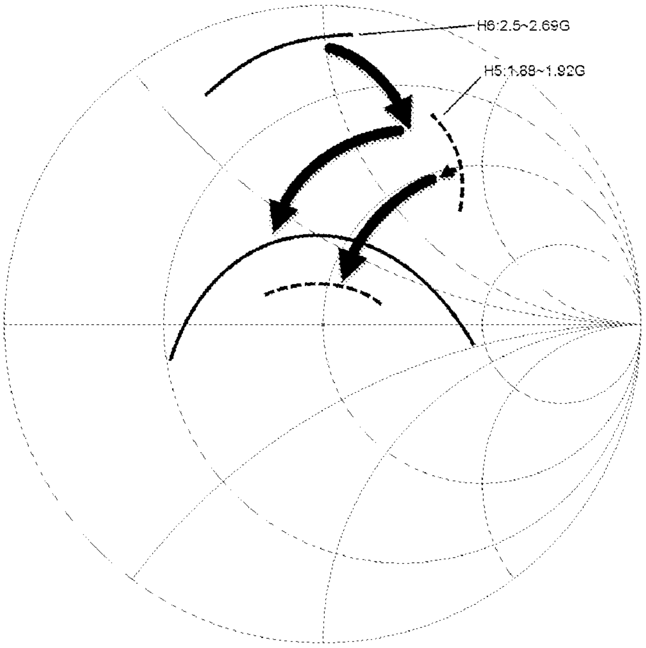
FIG. 11 is a fourth schematic diagram of a Smith chart according to an embodiment of the present disclosure.

For a schematic diagram of an impedance change after the antenna impedance at the point C in this embodiment, that is, the antenna impedance at the first terminal of the C1 passes through the L3, C2, and C1, reference may be made to FIG. 11. At this time, K1 and K3 are on, L3 and C2 are equivalent to an open circuit in the frequency band B39, and equivalent to a parallel capacitor in the frequency band B41.

Figure 12:
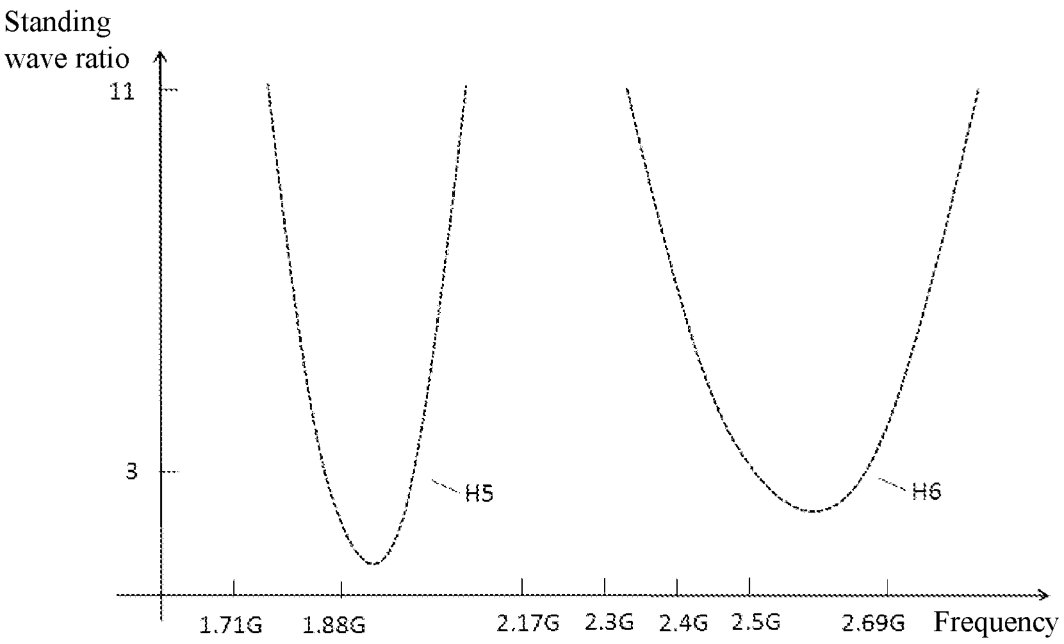
FIG. 12 is a second schematic diagram of antenna standing wave ratio coverage according to an embodiment of the present disclosure.

For a schematic diagram of standing wave ratios of the resonant modes H5 and H6 at the signal source in this embodiment, reference may be made to FIG. 12.

In FIG. 10, the antenna structure does not include a phase adjustment circuit. However, in some implementations, the phase adjustment circuit may be set depending on actual requirements. It should be noted that when B and C share the feed point (that is, there is a single feed point), at the point B, the first tuning circuit of K1 and K2 should be first connected in parallel, then a corresponding phase adjustment circuit is connected in series, and then the common connection point of C2, L3, and C1 is connected.

Embodiment 3

The main difference between this embodiment and Embodiment 1 lies in that a second tuning circuit is newly added, and the second tuning circuit in this embodiment is mainly used to adjust a resonant frequency of a target resonant mode of the antenna structure, improve an antenna standing wave ratio of a target frequency band of the target resonant mode, and reduce the mismatch loss.

Figure 13:
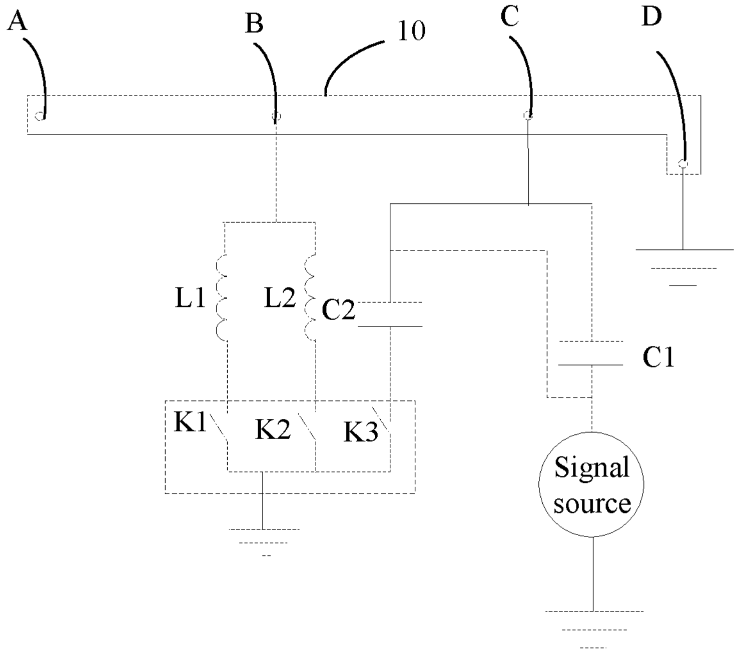
FIG. 13 is an eleventh schematic diagram of an antenna structure according to an embodiment of the present disclosure.

As shown in FIG. 13, the second tuning circuit in this embodiment includes K3 and C2 connected in series. K3 is equivalent to the foregoing first switch, and C2 is equivalent to the foregoing second capacitor. The second tuning circuit in this embodiment may be used to adjust the resonance frequencies of H2 and H3, so as to better improve the antenna standing wave ratios for B39 and B40, and reduce the mismatch loss. If C2 is on, the resonant frequencies of H2 and H3 decrease.

A difference between tuning frequencies at the point C and the point B lies in that although the tuning range at the point C is narrower, the switch loss of the point C is very low, which is suitable for small-range fine-tuning.

Certainly, in other embodiments, C2 can also be replaced by inductance tuning (that is, C2 is a matching device, specifically an inductor or a capacitor), and it is only required to appropriately adjust L1, L2, and the antenna length to achieve the above effects. In addition, C2 may alternatively be connected to the other terminal of C1, and a similar effect can also be achieved.

Embodiment 1, Embodiment 2, and Embodiment 3 are only described by taking a medium- and high-frequency antenna radiator as an example of the antenna radiator, but the antenna radiator in the embodiments of the present disclosure may also be a low-frequency antenna radiator.

When the antenna radiator is a low-frequency antenna radiator, the low-frequency antenna radiator may generate the resonant modes H1/H2/H3/H4, to cover B12 (0.7 GHz to 0.746 GHz)/B20 (0.79 GHz to 0.86 GHz)/B5 (0.824 GHz to 0.894 GHz)/B8 (0.88 GHz to 0.96 GHz).

In order to tune H4 as high as possible to B8, the length of AB is required to be less than ¼ wavelength of B8, and generally is 0 mm to 35 mm, with a typical value of 25 mm to 30 mm. In order to tune H1 as low as possible to B12, the antenna length of the AD section is required to be close to the ¼ wavelength of B12, and is about 40 mm to 60 mm, with a typical value of 45 mm to 55 mm. The length of AC is required to be at least 4 mm less than that of AD, and is generally 0 mm to 50 mm. In other words, the length of AC may be greater than, equal to, or less than that of AB, and its typical value is 33 mm to 45 mm. In addition, B and C may share one feed point, that is, there is a single feed point. In this case, the length of AC is required to be less than ¼ wavelength of B8, and is generally 0 mm to 35 mm, with a typical value of 28 mm to 35 mm, such that a quantity of feeding connection points can be reduced, which not only reduces the requirement for structural space, but also reduces impact on parasitic parameters of the feeding connection points. In this case, it is still required that the antenna impedance at the point C is in the first quadrant of the Smith chart in most of the frequency bands B3/B1/B39/B40/B41, and then a new resonant mode is excited or matched to 50 ohms by connecting a small capacitor C1 in series.

An embodiment of the present disclosure further provides a terminal including the antenna structure described above.

For the antenna structure, reference may be made to the foregoing description, which will not be repeated herein. It should be understood that, because the foregoing antenna structure is used, the terminal provided in this embodiment of the present disclosure has all the effects of the foregoing antenna structure, and details are not described herein again.

In practical applications, the communications terminal may be: a mobile phone, a Tablet Personal Computer, a Personal Digital Assistant (PDA), a Mobile Internet Device (MID), a Wearable Device, or the like.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. An antenna structure for a communications terminal, wherein the antenna structure comprises: an antenna radiator, a signal source, a first capacitor, and a first tuning circuit;

a first terminal of the antenna radiator is grounded;

a first terminal of the first capacitor and a first terminal of the first tuning circuit are electrically connected to a connection point of the antenna radiator, a second terminal of the first capacitor is electrically connected to the signal source, and a second terminal of the first tuning circuit is grounded, wherein a total length of the antenna radiator and a first length between a second terminal of the antenna radiator and a connection point electrically connected to the first tuning circuit are designed in order for an antenna impedance of the first terminal of the first capacitor at target frequencies to be in the first quadrant of a Smith chart, wherein the target frequencies are at least some frequencies in frequency bands covered by the antenna radiator.

2. The antenna structure according to claim 1, wherein the target frequencies are at least two thirds of frequencies in each frequency band covered by the antenna radiator.

3. The antenna structure according to claim 1, wherein the first terminal of the first capacitor is electrically connected to a first connection point of the antenna radiator, and the second terminal of the first tuning circuit is electrically connected to a second connection point of the antenna radiator; or the first terminal of the first capacitor and the first terminal of the first tuning circuit are electrically connected to the same connection point of the antenna radiator.

4. The antenna structure according to claim 1, wherein in order for the antenna impedance of the first terminal of the first capacitor at the target frequencies to be in the first quadrant of a Smith chart, a value range of the total length of the antenna radiator is set to be 3⁄16 wavelength to 3⁄8 wavelength of a center frequency of a first frequency band in the frequency bands covered by the antenna radiator; and the first length between the second terminal of the antenna radiator and the connection point electrically connected to the first tuning circuit is set to be less than ¼ wavelength of a second frequency band in the frequency bands covered by the antenna radiator, wherein the center frequency of the first frequency band is less than a center frequency of any frequency band other than the first frequency band in the frequency bands covered by the antenna radiator; and the center frequency of the second frequency band is greater than a center frequency of any frequency band other than the second frequency band in the frequency bands covered by the antenna radiator.

5. The antenna structure of claim 4, wherein when the first terminal of the first capacitor is electrically connected to a first connection point of the antenna radiator, and the second terminal of the first tuning circuit is electrically connected to a second connection point of the antenna radiator, an absolute difference between the total length and a second length between the second terminal of the antenna radiator and the first connection point is greater than a first specific value.

6. The antenna structure according to claim 5, wherein when the antenna radiator is a medium- and high-frequency antenna radiator, the value range of the total length is 16 mm to 22 mm; a value range of the first length is 0 mm to 12 mm; and a value range of the second length is 0 mm to 18 mm; and when the antenna radiator is a low-frequency antenna radiator, the value range of the total length is 40 mm to 60 mm; the value range of the first length is 0 mm to 35 mm; and the value range of the second length is 0 mm to 50 mm.

7. The antenna structure according to claim 1, wherein the antenna structure further comprises a phase adjustment circuit, and the first terminal of the first capacitor is electrically connected to the connection point of the antenna radiator via the phase adjustment circuit, wherein a phase adjustment range of the phase adjustment circuit comprises zero.

8. The antenna structure according to claim 7, wherein the antenna structure further comprises a second tuning circuit, a first terminal of the second tuning circuit is electrically connected to the first terminal of the first capacitor or the second terminal of the first capacitor, and a second terminal of the second tuning circuit is grounded.

9. The antenna structure according to claim 8, wherein the second tuning circuit comprises a tuning element and a first matching element connected in series, wherein a first terminal of the first matching element is electrically connected to the first terminal of the first capacitor or the second terminal of the first capacitor, and a second terminal of the first matching element is grounded via the tuning element.

10. The antenna structure according to claim 9, wherein the tuning element is a first switch or a variable capacitor; and the first matching element comprises a second capacitor and/or a first inductor, wherein when the first matching element is the second capacitor or the first inductor, the first terminal of the first matching element is electrically connected to the first terminal of the first capacitor or the second terminal of the first capacitor; and when the first matching element comprises the second capacitor and the first inductor connected in parallel, the first terminal of the first matching element is electrically connected to the first terminal of the first capacitor.

11. The antenna structure according to claim 1, wherein the first tuning circuit comprises a first sub-tuning circuit and a second sub-tuning circuit connected in parallel, wherein when the first sub-tuning circuit is in a first working state and the second sub-tuning circuit is in the first working state, the antenna radiator generates a first resonant mode;

when the first sub-tuning circuit is in a second working state and the second sub-tuning circuit is in the first working state, the antenna radiator generates a second resonant mode;

when the first sub-tuning circuit is in the first working state and the second sub-tuning circuit is in the second working state, the antenna radiator generates a third resonant mode; and when the first sub-tuning circuit is in the second working state and the second sub-tuning circuit is in the second working state, the antenna radiator generates a fourth resonant mode, wherein resonant frequencies of the first resonant mode, the second resonant mode, the third resonant mode, and the fourth resonant mode are in ascending order.

12. The antenna structure according to claim 11, wherein the first sub-tuning circuit comprises a second switch and a second matching element, and the second sub-tuning circuit comprises a third switch and a third matching element, wherein when the second switch and the third switch are both in an off state, the antenna radiator generates the first resonant mode;

when the second switch is in an on state and the third switch is in the off state, the antenna radiator generates the second resonant mode;

when the second switch is in the off state and the third switch is in the on state, the antenna radiator generates the third resonant mode; and when the second switch and the third switch are both in the on state, the antenna radiator generates the fourth resonant mode.

13. The antenna structure according to claim 12, wherein the second matching element comprises a second inductor, and the third matching element comprises a third inductor, wherein a value of the second inductor is greater than a value of the third inductor.

14. The antenna structure according to claim 13, wherein a value range of the second inductor is 8 nanohenries to 22 nanohenries, and a value range of the third inductor is 1 nanohenry to 5.6 nanohenries.

15. The antenna structure according to claim 1, wherein the first tuning circuit is composed of a variable capacitor; or the first tuning circuit is composed of a variable capacitor and a fixed inductor connected in series or in parallel.

16. The antenna structure according to claim 1, wherein a value of the first capacitor is less than a second specific value.

17. The antenna structure according to claim 16, wherein a value range of the first capacitor is 0.5 picofarads to 2.7 picofarads.

18. The antenna structure according to claim 16, wherein the first capacitor is a fixed capacitor or a variable capacitor.

19. A communications terminal, comprising an antenna structure, wherein the antenna structure comprises: an antenna radiator, a signal source, a first capacitor, and a first tuning circuit;

a first terminal of the antenna radiator is grounded;

a first terminal of the first capacitor and a first terminal of the first tuning circuit are electrically connected to a connection point of the antenna radiator, a second terminal of the first capacitor is electrically connected to the signal source, and a second terminal of the first tuning circuit is grounded, wherein a total length of the antenna radiator and a first length between a second terminal of the antenna radiator and a connection point electrically connected to the first tuning circuit are designed in order for an antenna impedance of the first terminal of the first capacitor at target frequencies to be in the first quadrant of a Smith chart, wherein the target frequencies are at least some frequencies in frequency bands covered by the antenna radiator.

20. The communications terminal according to claim 19, wherein the target frequencies are at least two thirds of frequencies in each frequency band covered by the antenna radiator.

* * * * *